United States Patent

[11] 3,522,766

| [72] | Inventor | John Wolbarst |
| | | Boston, Massachusetts |
| [21] | Appl. No. | 680,622 |
| [22] | Filed | Nov. 6, 1967 |
| [45] | Patented | Aug. 4, 1970 |
| [73] | Assignee | Polaroid Corporation |
| | | Cambridge, Massachusetts |
| | | a Corp. of Delaware |

[54] CARRYING STRAP FOR A SELF-DEVELOPING CAMERA
5 Claims, 4 Drawing Figs.

[52] U.S. Cl. .................................................. 95/86, 224/28
[50] Field of Search ....................................... 95/86, 13; 224/28; 150/47; 24/73

[56] References Cited
UNITED STATES PATENTS

| 2,130,262 | 9/1938 | Burlin.......................... | 95/86 |
| 2,483,014 | 9/1949 | Land............................ | 95/13 |
| 2,522,719 | 9/1950 | Johnson ....................... | 224/28 |
| 2,586,954 | 2/1952 | Juliano......................... | 95/86 |
| 3,416,427 | 12/1968 | Murphy........................ | 95/13X |
| 3,424,072 | 1/1969 | Hodgson ...................... | 95/13 |

Primary Examiner— Norton Ansher
Assistant Examiner— Leo H. McCormick, Jr.
Attorney— Brown and Mikulka and William D. Roberson and Leonard S. Selman ABSTRACT: A strap for carrying a hand-held self-developing camera is positioned on said camera body to aid in removing film from said camera body while initiating processing of the film. The strap allows the camera body freedom of movement to align itself in a direction parallel to the direction of movement of the film, the direction being defined by a line passing through the center of gravity of the camera body.

Patented Aug. 4, 1970

3,522,766

INVENTOR.
John Wolharst
BY Brown and Mikulka

Leonard S. Selman
ATTORNEYS

U.S. PATENT 3,522,766
CARRYING STRAP FOR A SELF-DEVELOPING CAMERA

BACKGROUND AND SUMMARY OF THE INVENTION

In many of the self-developing cameras in use today the film unit used therein comprises an image-recording or negative sheet and an image-receiving or positive sheet. A processing liquid is spread between the sheets to process them and produce the final picture by diffusion transfer.

The processing liquid is enclosed in a pod located on the film material so that upon rupturing of the pod the liquid may be spread between the negative and positive film sheets, as shown for example, in U.S. Pat. No. 2,647,056. In such a self-developing camera elements are provided such as rollers or the like with a narrow gap between them, and the film is manually pulled through the gap by a paper leader. This causes rupturing of the pod and spreading of the processing liquid between the sheets in a direction opposite to the direction of movement of the sheets. In order to obtain complete coverage of the processing liquid over the surface of the picture area, the direction of the pull and movement of the film unit should be approximately parallel to a center line extending the length of the film sheets. If the leader is pulled at an angle to that center line, the film will tend to become displaced angularly to its direction of travel through the gap and often the developer will not be spread uniformly and may, for example, miss a corner of the picture area. To avoid this possibility, the present invention provides a strap attached to the camera body opposite the door from which the leader extends and the film is removed. The strap is fastened to the camera body approximately on the line with the center line of the film. Preferably this center line lies in a plane which passes through or near the center of gravity of the camera. Thus the strap can be held in one hand and the film leader in the other, while the camera body automatically aligns itself parallel to the proper direction of movement of the film in relation to the spreader. Pull force can then be applied to both the camera body through the strap and the film leader to remove the film from the camera while spreading the developer uniformly.

Accordingly, it is an object of this invention to provide strap means on a self-developing camera body operable to and in the uniform spreading of developer between the film sheets as they are removed from the camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

DESCRIPTION OF THE PREFERRED EMBODIMENT

Figure 1:
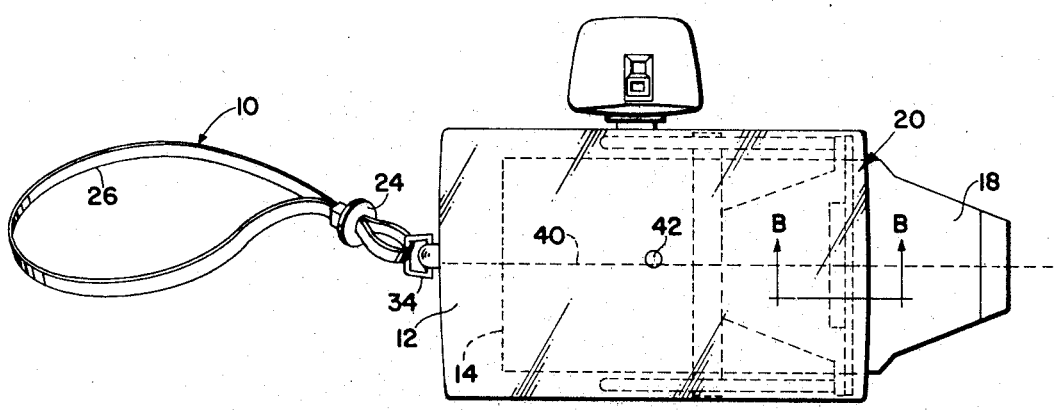
FIGURE 1 is a back view of a self-developing camera showing the strap connected on one end of the body and the film leader extending from the other end.
Figure 1A:
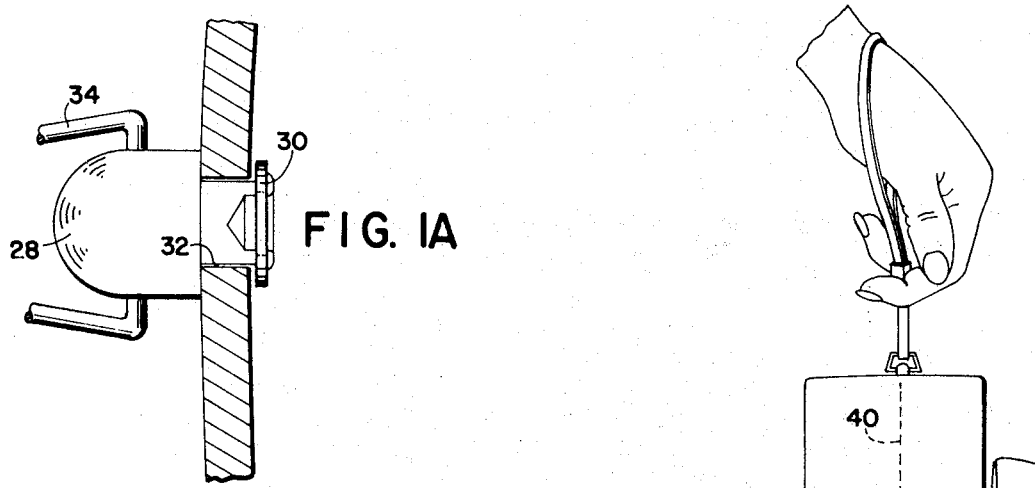
FIGURE 1A is an enlarged fragmentary cross-sectional view of the strap connecting stud member as shown in FIGURE 1.
Figure 2:
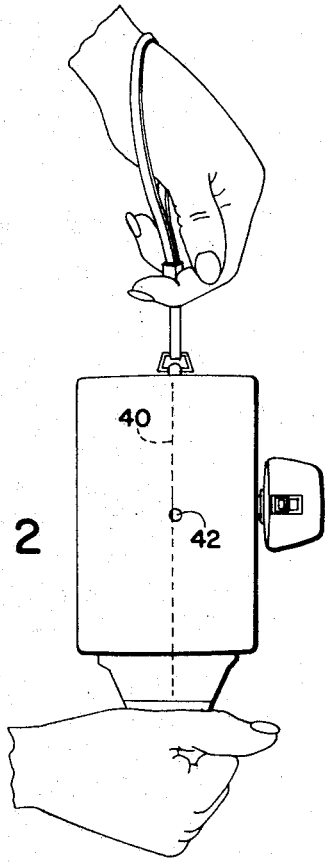
FIGURE 2 is an illustration of the invention in operation with one hand engaging the strap means and the other the film leader just before the film is separated from the camera.
Figure 1B:
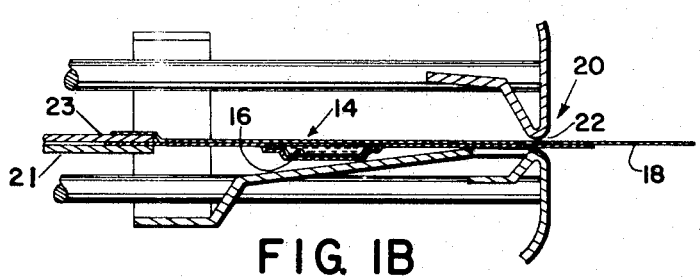
FIGURE 1B is a fragmentary cross-sectional view of the spreading apparatus taken along line B-B in FIGURE 1 showing the narrow gap between the spreading surfaces through which the film is moved.

FIGURE 1 of the drawing illustrates the position of the strap 10 with respect to the camera body 12. The film material 14 with the attached fluid containing pod 16 is shown in position to be removed from the camera by means of paper leader 18 extending from the camera body. A pair of spreader rollers or other spreading means as shown in FIG. 1B are indicated by reference numeral 20 and provide a narrow gap 22 through which the film material is moved, thereby rupturing the pod and spreading the fluid between the positive and negative sheets 21 and 23 of the film material. The gap extends in a direction perpendicular to the direction of movement of the film therethrough for effective spreading action. A puller member 24 is shown in FIGURE 1 which aids in applying pull force to the camera body. As shown in FIG. 2, the fingers may engage the puller member 24 while the hand passes through the strap loop 26. The strap may be attached to the camera body by means of a pivotable stud 28 which may rotate 360° in the opening provided for it in the camera body as shown in FIG. 1A. A washer 30 or the like prevents the stud 28 from slipping out of opening 32 but allows the stud to pivot so that the strap 10 may assume the proper position relative to the camera body. As shown in FIG. 1A the strap is looped around metal loop 34 which pivots in an opening 36 through stud 28 so complete freedom of movement of the strap is provided. The longitudinal center line of the film 40 and the longitudinal center of gravity 42 of the camera are also indicated in FIG. 2. The stud 28 attaching the strap to the camera is located on said camera body, such that a plane passing through said location also passes through said center of gravity as well as the center line of the film sheets. The exact position of the means connecting the strap to the camera body while approximately in the aforesaid plane may be slightly offset from said plane to allow for the natural tendency of the hands when pulled apart due to their movement in an arc from their connection to the shoulders to slightly bias the camera body and spreader apparatus from their proper position with respect to the direction of movement of the film. It should also be noted that because of the viewfinder mounted on the camera, for example, the longitudinal center of gravity of the camera body may not be exactly in the aforesaid plane but it is preferably located at or near the plane for effective operation. Thus, when the film leader 18 is grasped as shown in FIG. 2 and pull force is applied to the leader and strap, the camera body will align itself with respect to the film so that the film will move through the narrow gap between the spreaders in a direction substantially parallel to the center line 40 spreading the developer uniformly over the face of the picture surface.

In operation the camera may be held in front of the person by the strap with the camera body hanging down, as shown in FIG. 2, while the user grasps the leader 18 and by means of puller member 24 pulls the camera body up and away from the film in a direction parallel to the aforementioned center line of the film.

Since certain changes may be made in the above apparatus without departing from the scope of the invention herein involved, it is intended that all matter contained in the above description or shown in the accompanying drawing shall be interpreted as illustrated and not in a limiting sense.

I claim:

1. In a self-developing camera having a film chamber and spreading apparatus providing a narrow gap between a pair of spreading surfaces for spreading a processing liquid between negative and positive film sheets as said sheets move through said narrow gap and out of said film chamber through a film exit opening in one end of said camera body, said gap extending in a direction perpendicular to the direction of movement of the film therethrough the improvement comprising a carrying strap located at the other end of said camera body opposite said film exit opening, the strap being connected to said camera body by means positioned on said body approximately in a plane extending through said film sheets along a longitudinal center line thereof, said plane also passing through or near the longitudinal center of gravity of said camera body so that a user may hold said strap while removing the film from the camera causing the camera body to align itself in a direction parallel to the direction of movement of the film sheets in relation to the camera body.

2. The improvement according to Claim 1, wherein a puller member is provided on said strap and said strap forms a loop in part so that said loop may pass around the wrist of the user while his fingers engage said puller member.

3. The improvement according to Claim 1, wherein said strap is connected to said camera body by pivoting means which allow movement of the camera body to allow the camera body to align itself with the direction of movement of said film sheets.

4. In a self-developing camera having an elongated body with first and second end portions and containing a film chamber and spreading apparatus, said spreading apparatus being located adjacent said first end portion of said camera body and providing a narrow gap between a pair of spreading surfaces for spreading a processing liquid between negative and positive film sheets as said sheets move through said narrow gap and out of said film chamber through a film exit opening in one end of said camera body, said gap extending in a direction perpendicular to the direction of movement of the film therethrough, the improvement comprising: a carrying strap located at said second end portion of said camera body opposite said film exit opening, said strap being connected to said camera body by means positioned on said body approximately in a plane extending through said film sheets along a longitudinal center line thereof so that a user may hold said strap while removing the film from the camera causing said camera body to align itself in a direction parallel to the direction of movement of said film sheets in relation to said camera body.

5. The improvement according to claim 4, wherein said plane also passes approximately through or near the longitudinal center of gravity of said camera body.